Nov. 12, 1957  H. J. HOSEASON  2,812,654
WIRE FEEDER FLOOR DUCT
Filed Aug. 6, 1953

INVENTOR.
Harry J. Hoseason
BY
Alex E. MacRae
Attorney.

United States Patent Office 2,812,654
Patented Nov. 12, 1957

2,812,654

WIRE FEEDER FLOOR DUCT

Harry J. Hoseason, Toronto, Ontario, Canada

Application August 6, 1953, Serial No. 372,667

1 Claim. (Cl. 72—16)

This invention relates to wire-receiving floor ducts for cellular floor wire distributing systems.

In systems of this type, it is usual to provide metal feeder or crossover ducts into which are led wires from one or more of the base floor cells traversed by the duct. Such ducts must be of rigid structure since the final floor covering is usually applied directly thereto. Moreover, it is desirable that the duct be adjustable as to height and that the height be of smallest possible extent in order that the overall floor thickness be not excessive.

It is an object of this invention to provide a floor duct, the top and bottom walls of which are free of projections which would add to the height of the duct, and which includes means for readily adjusting the height of the duct as well as means for imparting great rigidity to the adjusted duct structure particularly at the joints of various lengths of the duct.

Figure 1:
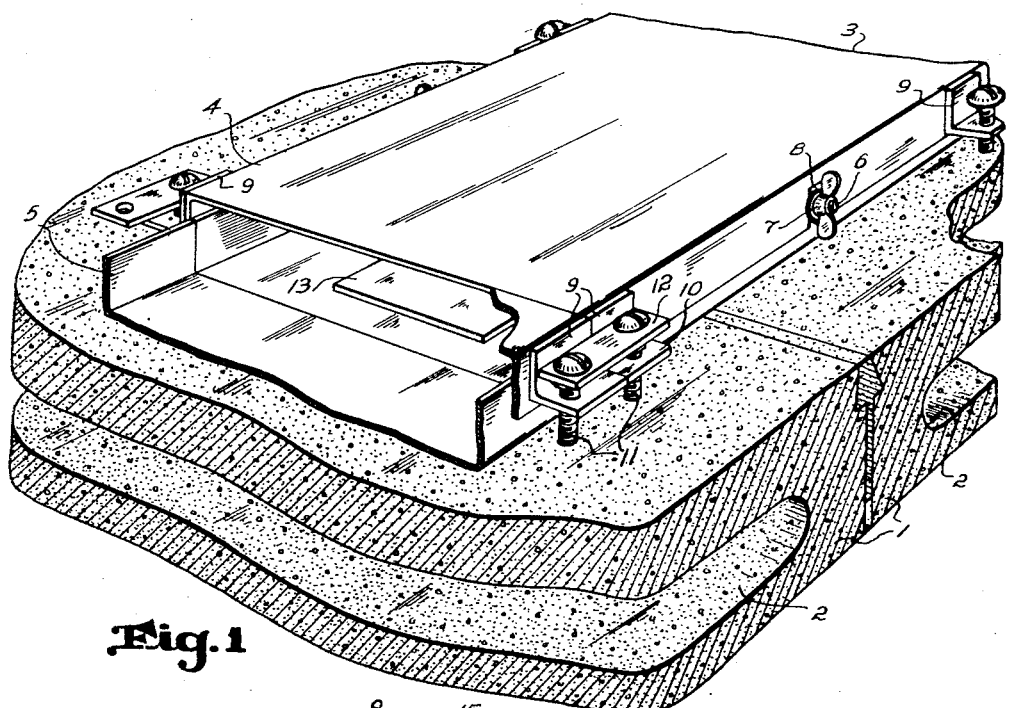
Figure 2:
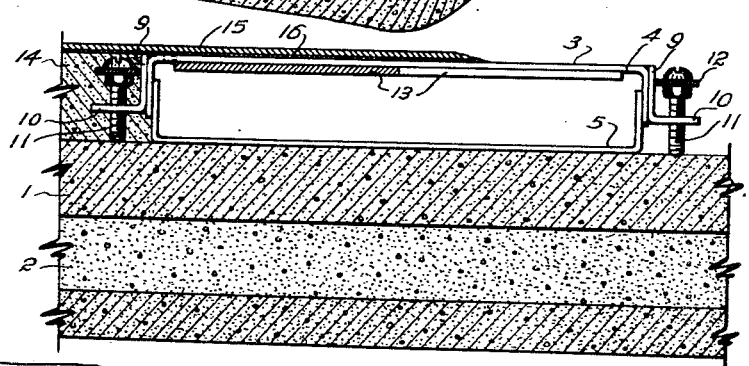
Figure 3:
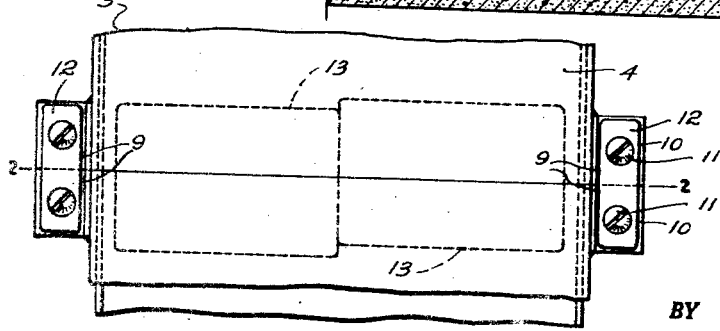

The invention will be described with reference to the accompanying drawing, in which Figure 1 is a perspective view of a portion of a cellular floor structure embodying the invention, Figure 2 is a partial transverse sectional elevation of a duct and related structure, and Figure 3 is a partial plan view of a duct joint structure.

In the drawing, the floor is shown as constructed of preformed concrete slabs 1 having wire receiving cells 2 therein. The feeder duct, of the present invention, which may be of metal or the like, is shown at 3. The duct 3 comprises a pair of upper and lower channel-shaped members 4 and 5 having overlapping edge walls connected together by bolts 6 and wing nuts 7. A slot 8, in the member 4, through which bolt 6 may slide, permits adjustment of the height of the duct upon loosening of the nut 7.

Means for adjusting the height of the duct and for supporting the duct in such adjusted position comprises a plurality of angle members 9 fixed to each edge wall of member 4 and each having a flange 10 extending right angularly from said wall. A supporting leg, such as a screw or stove bolt 11 or the like, is screw-threadedly mounted in each flange 10, the end of such leg being arranged to bear upon the surface of the underlying slab 1. It will be apparent that adjustment of the height of member 4 with respect to member 5 and slab 1 may be readily accomplished simply by imparting rotative movement to the bolt 11 (wing nuts 7 being loosened to permit such adjustment). When the height of the duct has been adjusted as desired by means of the bolts 11, the nuts 7 are tightened to lock the members 4 and 5 in adjusted position. It will be apparent that the legs 11 constitute, with bolts 6, an effective and rigid means for securing the members 4 and 5 in adjusted position.

It is proposed to provide an angle member 9 at the extreme end of each length of duct 3 to form the reinforced joint illustrated. Thus, the members 9 of each adjacent length of duct are in abutting relation at the joint to form a particularly well supported joint. Such an arrangement provides a convenient means for mounting the usual bridging ground strap 12, which is supported on the adjacent legs 11.

Preferably also, the joint is further reinforced by fixing an end projecting tab 13 to the interior surface of the top wall of each length of duct, such tab being arranged to underlap and abut the interior surface of the adjacent length of duct. As shown in Figures 2 and 3, each tab 13 is of such width and location that one side edge lies approximately on the longitudinal axis of the duct while the other side edge lies closely adjacent an end wall of the duct. Thus, with the ends of the duct lengths in abutting relation, the adjacent edges of the respective tabs will also be in abutting relation to provide a substantially continuous underlying support for the major portion of the top wall joint of the duct.

It will be observed that the upper and lower wall surfaces of the top and bottom walls of the duct are plane and uninterrupted to reduce the overall height thereof and facilitate the subsequent floor construction, which includes the customary top fill 14 of cementitious or like material. As shown, the fill 14 is flush with the top wall of the duct, and a floor covering such as linoleum 15, is then applied directly over the fill and ducts as by means of an adhesive layer 16.

I claim:

In combination with a cellular floor structure including a plurality of cementitious slabs arranged side by side in substantially coplanar relation, a wire feeder duct comprising a plurality of top channel members each having a web and two depending flange portions, a plurality of bottom channel members each having a web and two upstanding flange portions, the flange portions of said top channel members overlapping the flange portions of said bottom channel members and being overlapped and initially vertically slidable with respect to the flange portions of said bottom channel members, the web of each said bottom channel member having a substantially planar exterior lower surface extending from end to end of said bottom channel member, said lower surface engaging said slabs, the web of each said top channel member having a substantially planar exterior upper surface, said top and bottom channel members being longitudinally aligned in end to end abutment, means supporting each said top channel member for adjustment as to height with respect to the underlying bottom channel member, said means comprising a plate fixed to each end of each flange portion of said top channel member and extending substantially right angularly from said flange portion, and a screw bolt constituting a supporting leg having threaded engagement with each said plate, said bolt having a head above said plate and a lower end engaging one of said slabs, means including said bolts for securing together adjoining top channel members and comprising a bridging strap, one said bolt on each of said adjoining top channel members extending through said bridging strap, said strap engaging the heads on said bolts, and nuts securing said strap in place on said bolts, and means located between said plates adjustably securing together the overlapped flange portions of top and bottom channel members, said two securing means being entirely disposed between the planes of said lower and upper exterior surfaces.

References Cited in the file of this patent

UNITED STATES PATENTS

| 293,893 | Lindley et al. | Feb. 19, 1884 |
|---|---|---|
| 886,978 | Holabird | May 5, 1908 |
| 1,782,779 | Fullman | Nov. 25, 1930 |
| 1,995,855 | Lee | Mar. 26, 1935 |
| 2,081,197 | Goeller | May 25, 1937 |
| 2,122,577 | Mattes et al. | July 5, 1938 |
| 2,368,619 | Soderberg | Feb. 6, 1945 |